(12) United States Patent
Fields

(10) Patent No.: US 12,043,268 B2
(45) Date of Patent: *Jul. 23, 2024

(54) VEHICLE DRIVER PERFORMANCE BASED ON CONTEXTUAL CHANGES AND DRIVER RESPONSE

(71) Applicant: State Farm Mutual Automobile Insurance Company, Bloomington, IL (US)

(72) Inventor: Brian Mark Fields, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,534

(22) Filed: Nov. 8, 2022

(65) Prior Publication Data
US 2023/0062843 A1 Mar. 2, 2023

Related U.S. Application Data

(63) Continuation of application No. 16/669,228, filed on Oct. 30, 2019, now Pat. No. 11,529,959, which is a
(Continued)

(51) Int. Cl.
*B60W 40/09* (2012.01)
*B60W 40/04* (2006.01)
(Continued)

(52) U.S. Cl.
CPC ............ *B60W 40/09* (2013.01); *B60W 40/04* (2013.01); *B60W 40/06* (2013.01); *B60W 50/12* (2013.01);
(Continued)

(58) Field of Classification Search
CPC ....................................................... B60W 40/09
See application file for complete search history.

(56) References Cited

U.S. PATENT DOCUMENTS 8,831,813 B1 9/2014 Ferguson et al.
8,876,535 B2 11/2014 Fields et al.
(Continued)

FOREIGN PATENT DOCUMENTS

EP 3239686 11/2017
EP 3578433 A1 4/2019
(Continued)

OTHER PUBLICATIONS

Office Action for U.S. Appl. No. 17/833,410, mailed on Jan. 13, 2023, Fields, "Vehicle Driver Safety Performance Based on Relativity", 32 pages.
(Continued)

*Primary Examiner* — Michael A Berns
(74) *Attorney, Agent, or Firm* — Lee & Hayes, P.C.

(57) ABSTRACT

Systems and methods for determining the performance of a driver of a vehicle based on changes, over time, in the context and environment in which the vehicle operates, and any resultant driver behavior are disclosed. A set of driver response data is created from based on an analysis of time-series data indicative of the driver's operation of the vehicle in conjunction with time-series data indicative of changes in the vehicle's context/environment. The driver response data indicates the types and magnitudes of the driver's responses to various changes in the vehicle's operating context/environment and the driver's time-to-respond for each of the responses. That is, the driver response data indicates how a driver compensated his or her behavior (if at all) in response to different changes in the vehicle's context and/or environment. The driver response data may
(Continued)

be compared to one or more thresholds to determine the driver's performance.

20 Claims, 5 Drawing Sheets

Related U.S. Application Data continuation of application No. 15/592,467, filed on May 11, 2017, now Pat. No. 10,493,994.

(51) Int. Cl.
*B60W 40/06* (2012.01)
*B60W 50/12* (2012.01)
*G07C 5/00* (2006.01)
*H04L 67/12* (2022.01)
*G08G 1/0967* (2006.01)

(52) U.S. Cl.
CPC .............. *G07C 5/008* (2013.01); *H04L 67/12* (2013.01); *G08G 1/096791* (2013.01)

(56) References Cited

U.S. PATENT DOCUMENTS

| | | |
|---|---|---|
| 8,930,229 B2 | 1/2015 | Bowne et al. |
| 8,930,231 B2 | 1/2015 | Bowne et al. |
| 9,056,616 B1 | 6/2015 | Fields et al. |
| 9,180,888 B1 | 11/2015 | Fields et al. |
| 9,262,787 B2 | 2/2016 | Binion et al. |
| 9,275,552 B1 | 3/2016 | Fields et al. |
| 9,297,697 B2 | 3/2016 | Mujtaba et al. |
| 9,311,271 B2 | 4/2016 | Wright |
| 9,324,192 B2 | 4/2016 | Chakravarty et al. |
| 9,342,993 B1 | 5/2016 | Fields et al. |
| 9,361,599 B1 | 6/2016 | Biemer et al. |
| 9,373,203 B1 | 6/2016 | Fields et al. |
| 9,390,452 B1 | 7/2016 | Biemer et al. |
| 9,424,751 B2 | 8/2016 | Hodges et al. |
| 9,478,150 B1 | 10/2016 | Fields et al. |
| 9,530,333 B1 | 12/2016 | Fields et al. |
| 9,569,984 B2 | 2/2017 | Stankoulov |
| 9,586,591 B1 | 3/2017 | Fields et al. |
| 9,633,487 B2 | 4/2017 | Wright |
| 9,751,535 B1 | 9/2017 | Fields et al. |
| 9,764,742 B1 | 9/2017 | Goldfarb et al. |
| 9,817,399 B2 | 11/2017 | Braunstein et al. |
| 9,830,748 B2 | 11/2017 | Rosenbaum |
| 9,847,043 B1 | 12/2017 | Fields et al. |
| 9,955,319 B2 | 4/2018 | Matus et al. |
| 9,959,780 B2 | 5/2018 | Fields et al. |
| 9,990,782 B2 | 6/2018 | Rosenbaum |
| 10,192,369 B2 | 1/2019 | Wright |
| 10,198,879 B2 | 2/2019 | Wright |
| 10,269,190 B2 | 4/2019 | Rosenbaum |
| 10,395,526 B1 | 8/2019 | Slusar |
| 10,414,407 B1 | 9/2019 | Slusar |
| 10,430,695 B2 | 10/2019 | Sathyanarayana et al. |
| 10,467,824 B2 | 11/2019 | Rosenbaum |
| 10,493,994 B1 * | 12/2019 | Fields .................... G08G 1/012 |
| 10,713,717 B1 | 7/2020 | Hanson et al. |
| 10,915,964 B1 | 2/2021 | Purgatorio et al. |
| 10,921,805 B2 * | 2/2021 | Lin ........................ B60W 50/14 |
| 11,180,150 B2 | 11/2021 | Engel et al. |
| 11,227,452 B2 | 1/2022 | Rosenbaum |
| 11,354,616 B1 * | 6/2022 | Fields ................. G06Q 10/0639 |
| 11,407,410 B2 | 8/2022 | Rosenbaum |
| 11,524,707 B2 | 12/2022 | Rosenbaum |
| 11,529,959 B1 * | 12/2022 | Fields .................... G08G 1/017 |
| 11,560,177 B1 | 1/2023 | Fields |
| 11,594,083 B1 | 2/2023 | Rosenbaum |
| 11,783,264 B2 * | 10/2023 | Fields ................. G06Q 10/0639 |
| | | 705/7.38 |
| 2009/0114463 A1 | 5/2009 | Devault |
| 2010/0256835 A1 | 10/2010 | Mudalige |
| 2011/0246010 A1 | 10/2011 | de la Torre Bueno |
| 2011/0307188 A1 | 12/2011 | Peng et al. |
| 2013/0006675 A1 | 1/2013 | Bowne et al. |
| 2013/0008521 A1 | 1/2013 | Klug et al. |
| 2013/0024060 A1 | 1/2013 | Sukkarie et al. |
| 2013/0211660 A1 | 8/2013 | Mitchell |
| 2014/0032015 A1 | 1/2014 | Chun et al. |
| 2014/0162219 A1 | 6/2014 | Stankoulov |
| 2014/0199662 A1 | 7/2014 | Armitage et al. |
| 2015/0019266 A1 | 1/2015 | Stempora |
| 2015/0025917 A1 | 1/2015 | Stempora |
| 2015/0046197 A1 | 2/2015 | Peng et al. |
| 2015/0160019 A1 | 6/2015 | Biswal et al. |
| 2015/0262435 A1 | 9/2015 | Delong et al. |
| 2016/0114698 A1 | 4/2016 | Chow et al. |
| 2016/0117928 A1 | 4/2016 | Hodges et al. |
| 2016/0195406 A1 | 7/2016 | Miles et al. |
| 2016/0196613 A1 | 7/2016 | Miles et al. |
| 2016/0198306 A1 | 7/2016 | Miles et al. |
| 2017/0008521 A1 | 1/2017 | Braunstein et al. |
| 2017/0015318 A1 | 1/2017 | Scofield et al. |
| 2017/0032673 A1 | 2/2017 | Scofield et al. |
| 2017/0291608 A1 | 10/2017 | Engel et al. |
| 2017/0313332 A1 | 11/2017 | Paget et al. |
| 2018/0001899 A1 | 1/2018 | Shenoy et al. |
| 2018/0032072 A1 | 2/2018 | Hoye |
| 2018/0060970 A1 | 3/2018 | Oduor et al. |
| 2018/0077538 A1 | 3/2018 | Matus et al. |
| 2018/0208195 A1 | 7/2018 | Hutcheson et al. |
| 2018/0365533 A1 | 12/2018 | Sathyanarayana et al. |
| 2019/0025826 A1 | 1/2019 | Lin |
| 2019/0031193 A1 | 1/2019 | Kojima |
| 2022/0092893 A1 | 3/2022 | Rosenbaum |
| 2022/0300877 A1 | 9/2022 | Fields |
| 2022/0340148 A1 | 10/2022 | Rosenbaum |
| 2023/0060300 A1 | 3/2023 | Rosenbaum |
| 2023/0062843 A1 * | 3/2023 | Fields .................. G08G 1/0129 |
| 2023/0159102 A1 | 5/2023 | Fields |

FOREIGN PATENT DOCUMENTS

| | | |
|---|---|---|
| EP | 3730375 A1 | 4/2020 |
| EP | 3960576 A1 | 3/2022 |
| EP | 4190659 | 6/2023 |
| EP | 4190660 A1 | 6/2023 |
| WO | WO2020193863 | 10/2020 |

OTHER PUBLICATIONS

Office Action for U.S. Appl. No. 15/596,495, mailed on Mar. 10, 2023, Fields, "Autonomous Vehicle Operation Based on Real-Time Analytics", 40 pages.
Dikmen, et al., "Autonomous Driving in the Real World: Experiences with Tesla Autopilot and Summon", 8th International Conference on Automotive USer Interfaces and Interactive Vehicular Applications, 2016, pp. 225-228.
Pu, et al., "Implementing On-Board Diagnostic and GPS on VANET to Safe the Vehicle", 2015 International Conference on Connected Vehicles and Expo, 2015, pp. 13-18.
Keonyup, et al., "Local Path Planning for Off-Road Autonomous Driving With Avoidance of Static Obstacles", IEEE Transactions on Intelligent Transportation Systems, vol. 13, No. 4, 2012, pp. 1599-1616.
Final Office Action dated Mar. 16, 2020 for U.S. Appl. No. 15/703,648 "Real-Time Vehicle Driver Feedback Based on Analytics", Fields, 42 pages.
Non Final Office Action dated Jul. 22, 2020 for U.S. Appl. No. 15/703,648, "Real-Time Vehicle Driver Feedback Based on Analytics", Fields, 21 pages.
Non Final Office Action dated Aug. 26, 2020 for U.S. Appl. No. 15/592,503, "Vehicle Driver Safety Performance Based on Relativity", Fields, 28 pages.
Office Action for U.S. Appl. No. 15/596,495, mailed on Oct. 6, 2021, Fields, "Autonomous Vehicle Operation Based on Real-Time Analytics", 39 Pages.

(56) References Cited

OTHER PUBLICATIONS

Office Action for U.S. Appl. No. 15/703,648, mailed on Nov. 30, 2021, Fields, "Real-Time Vehicle Driver Feedback Based on Analytics", 33 Pages.

Final Office Action dated Dec. 9, 2020 for U.S. Appl. No. 15/596,495, "Autonomous Vehicle Operation Based on Real-Time Analytics", Fields, 32 pages.

Final Office Action dated Dec. 30, 2019 for U.S. Appl. No. 15/596,495 "Autonomous Vehicle Operation Based on Real-Time Analytics" Fields, 6 pages.

Office Action dated Feb. 22, 2021 for U.S. Appl. No. 15/703,648 "Real-Time Vehicle Driver Feedback Based on Analytics", Fields, 23pages.

Final Office Action dated Mar. 23, 2020 for U.S. Appl. No. 15/592,503 "Vehicle Driver Safety Performance Based on Relativity" Fields, 29 pages.

Non Final Office Action dated Mar. 8, 2021 for U.S. Appl. No. 15/592,503, "Vehicle Driver Safety Performance Based on Relativity", Fields, 28 pages.

Office Action for U.S. Appl. No. 16/669,228, mailed on Apr. 20, 2022, Fields, "Vehicle Driver Performance Based on Contextual Changes and Driver Response", 11 Pages.

Office Action for U.S. Appl. No. 15/596,495, mailed on Apr. 28, 2022, Fields, "Autonomous Vehicle Operation Based on Real-Time Analytics", 35 pages.

Non Final Office Action dated May 29, 20 for U.S. Appl. No. 15/596,495 "Autonomous Vehicle Operation Based on Real-Time Analytics" Fields, 28 pages.

Office Action for U.S. Appl. No. 15/703,648, mailed on Jul. 13, 2021, Fields, "Real-Time Vehicle Driver Feedback Based on Analytics", 27 pages.

Office Action for U.S. Appl. No. 15/596,495, mailed on Aug. 17, 2022, Fields, "Autonomous Vehicle Operation Based on Real-Time Analytics", 38 pages.

Office Action for U.S. Appl. No. 17/833,410, mailed on Sep. 22, 2022, Gurski, "833Vehicle Driver Safety Performance Based on Relativity", 27 Pages.

Office Action for U.S. Appl. No. 18/100,205, mailed on Jun. 23, 2023, Fields, "Real-Time Vehicle Driver Feedback Based on Analytics" 14 pages.

Office Action for U.S. Appl. No. 15/596,495, mailed on Jun. 23, 2023, Fields, "Autonomous Vehicle Operation Based on Real-Time Analytics", 40 pages.

* cited by examiner

VEHICLE DRIVER PERFORMANCE BASED ON CONTEXTUAL CHANGES AND DRIVER RESPONSE

CROSS-REFERENCE TO RELATED APPLICATIONS

This application is a continuation of and claims priority to U.S. patent application Serial No. U.S. Ser. No. 16/669,228 filed on Oct. 30, 2019 and entitled, "VEHICLE DRIVER PERFORMANCE BASED ON CONTEXTUAL CHANGES AND DRIVER RESPONSE," which is a continuation of and claims priority to U.S. application Ser. No. 15/592,467, filed on May 11, 2017 and entitled "VEHICLE DRIVER PERFORMANCE BASED ON CONTEXTUAL CHANGES AND DRIVER RESPONSE," issued as U.S. Pat. No. 10,493,994, the entirety contents of which are incorporated herein by reference.

TECHNICAL FIELD

The present disclosure generally relates to systems and methods for determining or rating driver performance based on the context in which the driver is operating a vehicle and the driver's responses to changes in the context.

BACKGROUND

Vehicles are typically operated by a human vehicle operator (e.g., a vehicle driver) who controls both steering and motive controls. Currently known methods for determining or rating a driver's performance typically include collecting telematics data from the driver's vehicle while a driver operates the vehicle, and analyzing the collected data to generate a rating or determination of the driver's performance in operating the vehicle. Typical telematics data that is collected to rate a driver's performance include vehicle movement data such as speed, acceleration, cornering, braking, and the like. Other data that is conventionally used in rating a driver's performance include the time of day, miles traveled, and whether (or not) and/or where the vehicle is garaged. Conventionally, a driver's performance rating is reflected by an average over a period of time, such as a six-month or yearly average.

SUMMARY

The present disclosure generally relates to systems and methods for determining or rating driver performance based on the context in which the driver is operating a vehicle and the driver's responses (e.g., types of responses, time to respond, magnitude of response, etc.) to changes in the context. Embodiments of example systems and methods are summarized below. The methods and systems summarized below may include additional, less, or alternate actions, including those discussed elsewhere herein.

In an embodiment, a system for determining driver performance may comprise a set of sensors fixedly attached to a vehicle being operated by a driver and a transmitter that is disposed at the vehicle to transmit, via a wireless communication channel, a first set of time-series data obtained by the set of sensors. Each data point included in the first set of time-series data may be associated with a respective time stamp and a respective geospatial location, for example. The system may further comprise one or more remote computing devices that are communicatively connected to the wireless communication channel and that include one or more processors, one or more memories, and a set of computer-executable instructions stored on the one or more memories. The set of computer-executable instructions may be executable by the one or more processors to collect, via the wireless communication channel, the first set of time-series data obtained by the set of sensors of the vehicle; map the first set of time-series data with a second set of time-series data, where the second set of time-series data is indicative of contextual attributes of an environment in which the vehicle is operating, and where each data point included in the second set of time-series data is associated with a respective time stamp and a respective geospatial location; generate, based on the mapped time-series data, a set of response data indicative of respective responses of the driver to one or more changes to one or more conditions that occur while the driver is operating the vehicle, where the set of response data includes data indicative of respective elapsed time intervals between respective occurrences of the one or more changes and the driver's respective responses; and generate, based on the set of response data corresponding to the driver, an indication of a level of performance of the driver.

In an embodiment, a method for determining driver performance may comprise collecting, via a wireless communication channel having one end terminating at a vehicle being operated by a driver, and by a set of remote computing devices communicatively connected to the wireless communication channel, a first set of time-series data obtained by a set of sensors fixedly attached the vehicle. Each data point included in the first set of time-series data may be associated with a respective time stamp and a respective geospatial location, for example. The method may also comprise mapping, by the set of remote computing devices, the first set of time-series data with a second set of time-series data, where the second set of time-series data is indicative of contextual attributes of an environment in which the vehicle is operating, and where each data point included in the second set of time-series data is associated with a respective time stamp and a respective geospatial location. Additionally, the method may comprise generating, by the set of remote computing devices and based on the mapped time-series data, a set of response data indicative of the respective responses of the driver to one or more changes to one or more conditions that occur while the driver is operating the vehicle, where the set of response data includes data indicative of respective elapsed time intervals between respective occurrences of the one or more changes to the one or more conditions and the driver's respective responses; generating, based on the set of response data corresponding to the driver, an indication of a level of performance of the driver; and transmitting at least one of the indication of the level of performance of the driver or at least a portion of the set of response data corresponding to the driver to at least one of: the vehicle being operated by the driver, a user interface, or another computing device.

Systems or computer-readable media storing executable instructions for implementing all or part of the systems and/or methods described herein may also be provided in some embodiments. Systems for implementing such methods may include one or more of the following: a special-purpose computing device, a mobile computing device, a personal electronic device, an on-board computer, one or more remote servers or cloud computing system, one or more remote data storage entities, one or more sensors, one or more communication modules configured to communicate wirelessly via radio links, radio frequency links, and/or wireless communication channels, and/or one or more non-transitory, tangible program memories coupled to one or more processors of the special-purpose computing device, mobile computing device, personal electronic device, on-board computer, and/or one or more remote servers or cloud computing system. Such program memories may store instructions, which, when executed by the one or more processors, may cause a system described herein to implement part or all of one or more methods described herein. Additional or alternative features described herein below may be included in some embodiments.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1A:
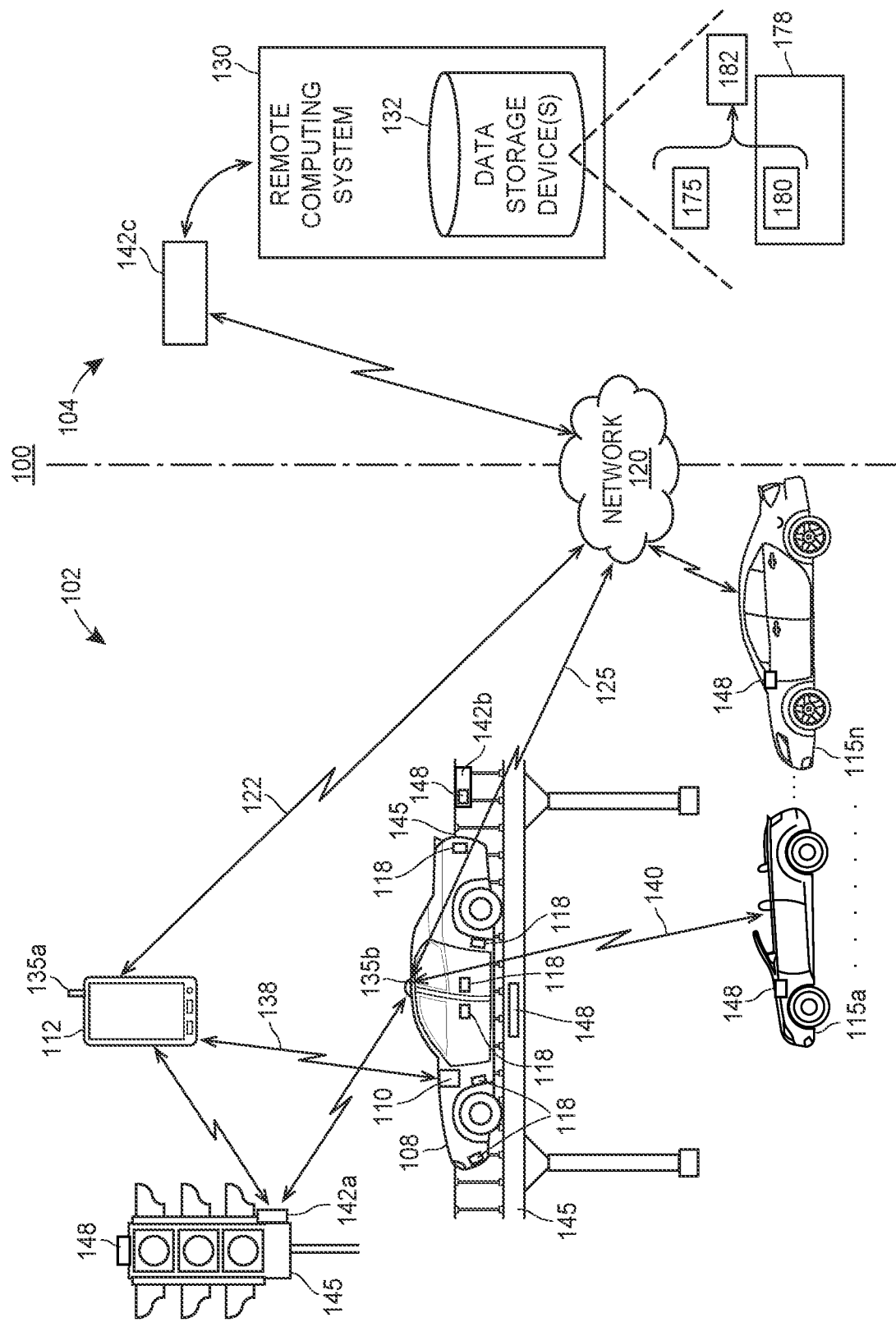
FIG. 1A illustrates a block diagram of an exemplary system for determining a vehicle driver's performance based on contextual changes and the driver's response.

Currently known techniques for determining or rating a driver's performance typically include collecting telematics data from a vehicle while a driver operates the vehicle, and analyzing the collected data to generate a rating or determination of the driver's performance in operating the vehicle. Typical telematics data that is collected to rate a driver's performance include vehicle movement data such as speed, acceleration, cornering, braking, and the like. Other data that is often used in rating a driver's performance include the time of day, miles traveled, and whether (or not) and/or where the vehicle is garaged. Conventionally, a driver's performance rating is reflected by an average over a period of time, such as a six-month or yearly average.

An example of such an known technique for determining or rating a driver's performance is described in U.S. Patent Publication No. 20160198306 ("the '306 publication"), which shares a common assignee with the present disclosure, and whose contents are hereby incorporated by reference herein in their entirety. Generally speaking, the '306 publication describes obtaining data from sensors disposed at a vehicle while a driver is operating the vehicle. The vehicle sensor data may be analyzed together with relevant contextual data, such as data indicative of the location and/or driving environment in which the driver is operating the vehicle. Contextual data which may include, for example, the type of road on which the vehicle is traveling, the speed limit, traffic signs and lights, traffic density, weather, etc. Different "notable driving events," such as instances of notable acceleration, braking, and cornering, as well as the severity of such events, may be identified based on the vehicle sensor data and the contextual data. For example, to identify a notable cornering driving event, different thresholds may be used in dry weather conditions, rainy weather conditions, and icy weather conditions. In another example, to identify a notable braking driving event, different thresholds may be used for highway driving, non-highway driving, low-traffic driving, high-traffic driving, approaching a stop sign intersection, approaching a stop light intersection, etc.

However, these and other currently known techniques for determining or rating a driver's performance do not take into account any changes in the context in which the vehicle is being driven and the appropriateness and timeliness of the response of the driver to the changes (e.g., the time it takes a driver to respond to a particular change in the context of the operating vehicle, respective types of one or more eventual driver responses, respective magnitudes of eventual driver responses, etc.), as is made possible by the novel techniques, systems, and methods disclosed herein. For example, while currently known techniques may be able to identify that a driver performed a notable braking event, e.g., braking due to a bicycle cutting across the vehicle's path of travel, currently known techniques are not able to discern how quickly and how forcefully the driver applied the brakes upon the bicycle entering the vehicle's path of travel, and/or whether or not other types of mitigating actions such as swerving may have been more desirable in such a situation, as is made possible by the novel techniques, systems, and methods disclosed herein. Accordingly, as the present disclosure takes into consideration the changes in context while the vehicle is being driven and the quality of the driver's responses thereto (if any), the present disclosure is able to provide a more accurate or granular determination of a driver's performance, which may then be utilized for any number of useful applications such as determining risk, adjusting operations of the vehicle and/or of other surrounding vehicles (e.g., of fully and/or semi-autonomous vehicles operating in the vicinity of the vehicle), training and/or educating the driver, and the like. Generally speaking, the novel techniques, systems and methods disclosed herein may determine or rate a driver's performance based on how quickly a driver notices and compensates for changing driving conditions, and the appropriateness of the driver's temporal, compensatory actions for the changes.

FIG. 1A illustrates a block diagram of an exemplary system 100 for determining the performance of the driver of a vehicle based on contextual changes in the environment in which the vehicle is operating and the driver's resultant response (if any). The high-level architecture illustrated in FIG. 1A may include both hardware and software applications, as well as various data communications channels for communicating data between the various hardware and software components, as is described below. The system 100 may be roughly divided into front-end components 102 and back-end components 104. The front-end components 102 may obtain information regarding a vehicle 108 (e.g., a car, truck, motorcycle, etc.) that is being operated by driver and regarding the context and surrounding environment in which the vehicle 108 is being operated. One or more on-board computers 110 and/or one or more mobile devices 112 that are included in the front-end components 102 and disposed at the vehicle 108 may utilize this information to, for example, notify or alert the driver of the vehicle 108, notify or alert other drivers and other vehicles 115a-115n that are operating in the surrounding environment, automatically change an operating behavior of the vehicle 108 and/or of any one or more of the other vehicles 115a-115n, and/or to assist the driver in operating the vehicle 108. The one or more on-board computers 110 may be permanently or removably installed in the vehicle 108, and the one or more mobile devices 112 may be disposed at and transported by the vehicle 108, for example.

Generally speaking, the on-board computer 110 may be an on-board computing device capable of performing various functions relating to vehicle operations and determining driver performance. That is, the on-board computer 110 may be particularly configured with particular elements to thereby be able to perform functions relating to determining driver performance and/or vehicle operations. Further, the on-board computer 110 may be installed by the manufacturer of the vehicle 108, or as an aftermarket modification or addition to the vehicle 108. In FIG. 1A, although only one on-board computer 110 is depicted, it should be understood that in some embodiments, a plurality of on-board computers 110 (which may be installed at one or more locations within the vehicle 108) may be used. However, for ease of reading and not for limitation purposes, the on-board computing device or computer 110 is referred to herein using the singular tense.

The mobile device 112 may be transported by the vehicle 108 and may be, for example, a personal computer or personal electronic device (PED), cellular phone, smart phone, tablet computer, smart watch, wearable electronics, or a dedicated vehicle monitoring or control device which may be releasably attached to the vehicle 108. Although only one mobile device 112 is illustrated in FIG. 1A, it should be understood that in some embodiments, a plurality of mobile devices 112 may be included in the system 100. For ease of reading and not for limitation purposes, though, the mobile device 112 is referred to herein using the singular tense.

Further, it is noted that, in some embodiments, the on-board computer 110 may operate in conjunction with the mobile device 112 to perform any or all of the functions described herein as being performed on-board the vehicle 108. In other embodiments, the on-board computer 110 may perform all of the on-board vehicle functions described herein, in which case either no mobile device 112 is being transported by the vehicle 108, or any mobile device 112 that is being transported by the vehicle 108 is ignorant or unaware of vehicle and driver operations. In still other embodiments, the mobile device 112 may perform all of the onboard vehicle functions described herein. Still further, in some embodiments, the on-board computer 110 and/or the mobile device 112 may perform any or all of the functions described herein in conjunction with one or more back-end components 104. For example, in some embodiments or under certain conditions, the mobile device 112 and/or on-board computer 110 may function as thin-client devices that outsource some or most of the processing to one or more of the back-end components 104.

At any rate, the on-board computing device 110 and/or the mobile device 112 disposed at the vehicle 108 may communicatively interface with one or more on-board sensors 118 that are disposed on or within the vehicle 108 and that may be utilized to monitor the vehicle 108 and the environment in which the vehicle is operating 108. That is, the one or more on-board sensors 118 may sense conditions associated with the vehicle 108 and/or associated with the environment in which the vehicle 108 is operating, and may collect data indicative of the sensed conditions. In some configurations, at least some of the on-board sensors 118 may be fixedly disposed at various locations on the vehicle 108. Additionally or alternatively, at least some of the on-board sensors may be incorporated within or connected to the on-board computer 110. Still additionally or alternatively, in some configurations, at least some of the on-board sensors 118 may be included on or within the mobile device 112. Whether disposed at or on the vehicle 108 or disposed at or on a mobile device 112 being transported by the vehicle 108, though, the one or more of the sensors 118 are generally referred to herein as "on-board sensors 118," and the data collected by the on-board sensors 118 is generally referred to herein as "sensor data," "on-board sensor data," or "vehicle sensor data." The on-board sensors 118 may communicate respective sensor data to the on-board computer 110 and/or to the mobile device 112, and the sensor data may be processed using the on-board computer 110 and/or the mobile device 112 to determine when the vehicle is in operation as well as determine information regarding the vehicle 108, the vehicle's operating behavior, and/or the driver's operating behavior and performance. In some situations, the on-board sensors 118 may communicate respective sensor data indicative of the environment in which the vehicle 108 is operating.

As discussed above, at least some of the on-board sensors 118 associated with the vehicle 108 may be removably or fixedly disposed within or at the vehicle 108, and further may be disposed in various arrangements and at various locations to sense and provide information. The sensors 118 that are installed at the vehicle 108 may include one or more of a GPS unit, a radar unit, a LIDAR unit, an ultrasonic sensor, an infrared sensor, some other type of electromagnetic energy sensor, an inductance sensor, a camera, an accelerometer, an odometer, a system clock, a gyroscope, a compass, a geo-location or geo-positioning unit, a location tracking sensor, a proximity sensor, a tachometer, and/or a speedometer, to name a few. Some of the on-board sensors 118 (e.g., GPS, accelerometer, or tachometer units) may provide sensor data indicative of, for example, the vehicle's location, speed, position acceleration, direction, responsiveness to controls, movement, etc. Other sensors 118 that are disposed at the vehicle 108 may be directed to the interior or passenger compartment of the vehicle 108, such as cameras, microphones, pressure sensors, weight sensors, thermometers, or similar sensors to monitor the vehicle operator, any passengers, operations of instruments included in the vehicle, operational behaviors of the vehicle, and/or conditions within the vehicle 108. For example, on-board sensors 118 directed to the interior of the vehicle 108 may provide sensor data indicative of, for example, in-cabin temperatures, in-cabin noise levels, data from seat sensors (e.g., indicative of whether or not a person is using a seat, and thus the number of passengers being transported by the vehicle 108), data from seat belt sensors, data regarding the operations of user controlled devices such as windshield wipers, defrosters, traction control, mirror adjustment, interactions with on-board user interfaces, etc. Some of the sensors 118 disposed at the vehicle 108 (e.g., radar, LIDAR, camera, or other types of units that operate by using electromagnetic energy) may actively or passively scan the environment external to the vehicle 108 for obstacles (e.g., other vehicles, buildings, pedestrians, trees, gates, barriers, animals, etc.) and their movement, weather conditions (e.g., precipitation, wind, visibility, or temperature), roadways, road conditions (e.g., lane markings, potholes, road material, traction, or slope), road topography, traffic conditions (e.g., traffic density, traffic congestion, etc.), signs or signals (e.g., traffic signals, speed limits, other jurisdictional signage, construction signs, building signs or numbers, or control gates), and/or other information indicative of the vehicle's environment. Information or data that is generated or received by the on-board sensors 118 may be communicated to the on-board computer 110 and/or to the mobile device 112, for example.

In some embodiments of the system 100, the front-end components 102 may communicate collected sensor data to the back-end components 104, e.g., via a network 120. For example, at least one of the on-board computer 110 or the mobile device 112 may communicate with the back-end components 104 via the network 120 to allow the back-end components 104 to record collected sensor data and information regarding vehicle usage. The network 120 may include a proprietary network, a secure public internet, a virtual private network, and/or some other type of network, such as dedicated access lines, plain ordinary telephone lines, satellite links, cellular data networks, combinations of these and/or other types of networks. The network 120 may utilize one or more radio frequency communication links to communicatively connect to the vehicle 108, e.g., utilize wireless communication links 122 and 125 to communicatively connect with mobile device 112 and on-board computer 110, respectively. Where the network 120 comprises the Internet or other data packet network, data communications may take place over the network 120 via an Internet or other suitable data packet communication protocol. In some arrangements, the network 120 additionally or alternatively includes one or more wired communication links or networks.

The back-end components 104 include one or more servers or computing devices, which may be implemented as a server bank or cloud computing system 130, and is interchangeably referred to herein as a "remote computing system 130." The remote computing system 130 may include one or more computer processors adapted and configured to execute various software applications and components of the system 100, in addition to other software applications. The remote computing system 130 may further include or be communicatively connected to one or more data storage devices or entities 132, which may be adapted to store data related to the operation of the vehicle 108, driver performance, the environment and context in which the vehicle 108 is operating, and/or other information. For example, the one or more data storage devices 132 may be implemented as a data bank or a cloud data storage system, at least a portion of which may be locally accessed by the remote computing system 130 using a local access mechanism such as a function call or database access mechanism, and/or at least a portion of which may be remotely accessed by the remote computing system 130 using a remote access mechanism such as a communication protocol. At any rate, the remote computing system 130 may access data stored in the one or more data storage devices 132 when executing various functions and tasks associated with the present disclosure.

To communicate with the remote computing system 130 and other portions of the back-end components 104, the front-end components 102 may include one or more communication components 135*a*, 135*b* that are configured to transmit information to and receive information from the back-end components 104 and, in some embodiments, transmit information to and receive information from other external sources, such as other vehicles and/or infrastructure or environmental components disposed within the vehicle's environment. The one or more communication components 135*a*, 135*b* may include one or more wireless transmitters or transceivers operating at any desired or suitable frequency or frequencies. Different wireless transmitters or transceivers may operate at different frequencies and/or by using different protocols, if desired. In an example, the mobile device 112 may include a respective communication component 135*a* for sending or receiving information to and from the remote computing system 130 via the network 120, such as over one or more radio frequency links or wireless communication channels 122 which support a first communication protocol (e.g., GSM, CDMA, LTE, one or more IEEE 802.11 Standards such as Wi-Fi, WiMAX, BLUETOOTH, etc.). Additionally or alternatively, the on-board computer 110 may operate in conjunction with an on-board transceiver or transmitter 135*b* that is disposed at the vehicle 108 (which may, for example, be fixedly attached to the vehicle 108) for sending or receiving information to and from the remote computing system 130 via the network 120, such as over one or more radio frequency links or wireless communication channels 125 which support the first communication protocol and/or a second communication protocol. In some embodiments, the on-board computer 110 may operate in conjunction with the mobile device 112 to utilize the communication component 135*a* of the mobile device 112 and the link 122 to deliver information to the back-end components 104. In some embodiments, the on-board computer 110 may operate in conjunction with the mobile device 112 to utilize the communication component 135*b* of the vehicle 108 and the link 125 to deliver information to the back-end components 104. In some embodiments, both communication components 135*a*, 135*b* and their respective links 122, 125 may be utilized by the on-board computer 110 and/or the mobile device 112 to communicate with the back-end components 104.

Accordingly, either one or both of the mobile device 112 or on-board computer 110 may communicate with the network 120 over the links 122 and/or 125. Additionally, in some configurations, the mobile device 112 and on-board computer 110 may communicate with one another directly over a link 138, which may be a wireless or wired link.

In some embodiments of the system 100, the on-board computer 110 and/or the on-board mobile device 112 of the vehicle 108 may communicate with respective on-board computers and/or mobile devices disposed at one or more other vehicles 115*a*-115*n*, either directly or via the network 120. For example, the on-board computer 110 and/or the mobile device 112 disposed at the vehicle 108 may communicate with other vehicles' respective on-board computers and/or mobile devices via the network 120 and one or more of the communication components 135*a*, 135*b* by using one or more suitable wireless communication protocols (e.g., GSM, CDMA, LTE, one or more IEEE 802.11 Standards such as Wi-Fi, WiMAX, BLUETOOTH, etc.). In some configurations, the on-board computer 110 may communicate with a particular vehicle 115*a*-115*n* directly in a peer-to-peer (P2P) manner via one or more of the communication components 135*a*, 135*b* and the direct wireless communication link 140, which may utilize, for example, a Wi-Fi direct protocol, a BLUETOOTH or other short range communication protocol, an ad-hoc cellular communication protocol, or any other suitable wireless communication protocol.

In some embodiments, the system 100 may include one or more environmental communication components or devices, examples of which are depicted in FIG. 1A by references 142a, 142b, 142c, that are used for monitoring the status of one or more infrastructure components 145 and/or for receiving data generated by other sensors 148 that are associated with the vehicle 108 and disposed at locations that are off-board the vehicle 108. As generally referred to herein, with respect to the vehicle 108, "off-board sensors" or "environmental sensors" 148 are sensors that are not being transported by the vehicle 108. The data collected by the off-board sensors 148 is generally referred to herein as "sensor data," "off-board sensor data," or "environmental sensor data" with respect to the vehicle 108.

At least some of the off-board sensors 148 may be disposed on or at the one or more infrastructure components 145 or other types of components that are fixedly disposed within the environment in which the vehicle 108 is traveling. Infrastructure components 145 may include roadways, bridges, traffic signals, gates, switches, crossings, parking lots or garages, toll booths, docks, hangars, or other similar physical portions of a transportation system's infrastructure, for example. Other types of infrastructure components 145 at which off-board sensors 148 may be disposed may include a traffic light, a street sign, a railroad crossing signal, a construction notification sign, a roadside display configured to display messages, a billboard display, a parking garage monitoring device, etc. Off-board sensors 148 that are disposed on or near infrastructure components 145 may generate data relating to the presence and location of obstacles or of the infrastructure component 145 itself, weather conditions, traffic conditions, operating status of the infrastructure component 145, and/or behaviors of various vehicles 108, 115a-115n, pedestrians, and/or other moving objects within the vicinity of the infrastructure component 145, for example.

Additionally or alternatively, at least some of the off-board sensors 148 that are communicatively connected to the one or more infrastructure devices 145 may be disposed on or at one or more other vehicles 115a-115n operating in the vicinity of the vehicle 108. As such, a particular sensor that is disposed on-board another vehicle 115a may be viewed as an off-board sensor 148 with respect to the vehicle 108.

At any rate, the one or more environmental communication devices 142a-142c that are associated with the vehicle 108 may be communicatively connected (either directly or indirectly) to one or more off-board sensors 148, and thereby may receive information relating to the condition and/or location of the infrastructure components 145, of the environment surrounding the infrastructure components 145, and/or of other vehicles 115a-115n or objects within the environment of the vehicle 108. In some embodiments, the one or more environmental communication devices 142a-142c may receive information from the vehicle 108, while, in other embodiments, the environmental communication device(s) 142a-142c may only transmit information to the vehicle 108. As previously discussed, at least some of the environmental communication devices may be locally disposed in the environment in which the vehicle 108 is operating, e.g., as denoted by references 142a, 142b. In some embodiments, at least some of the environmental communication devices may be remotely disposed, e.g., at the back-end 104 of the system 100 as denoted by reference 142c. In some embodiments, at least a portion of the environmental communication devices may be included in (e.g., integral with) one or more off-board sensors 148, e.g., as denoted by reference 142b. In some configurations, at least some of the environmental communication devices 142 may be included or integrated into the one or more on-board communication components 135a, 135b, the on-board computer 110, and/or the mobile device 112 of surrounding vehicles 115a-115n (not shown).

In addition to receiving information from the on-board sensors 118 and off-board sensors 148 associated with the vehicle 108, the on-board computer 110 at the vehicle 108 may directly or indirectly control the operation of the vehicle 108 according to various fully- or semi-autonomous operation features. The autonomous operation features may include software applications or modules implemented by the on-board computer 110 to generate and implement control commands to control the steering, braking, or motive power of the vehicle 108. To facilitate such control, the on-board computer 110 may be communicatively connected to control components of the vehicle 108 by various electrical or electromechanical control components (not shown). When a control command is generated by the on-board computer 110, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

Further, the on-board computer 110 may control one or more operations of the vehicle 108 when the vehicle is operating non-autonomously. For example, the on-board computer 110 may automatically detect respective triggering conditions and automatically activate corresponding features such as traction control, windshield wipers, headlights, braking, etc.

Figure 1B:
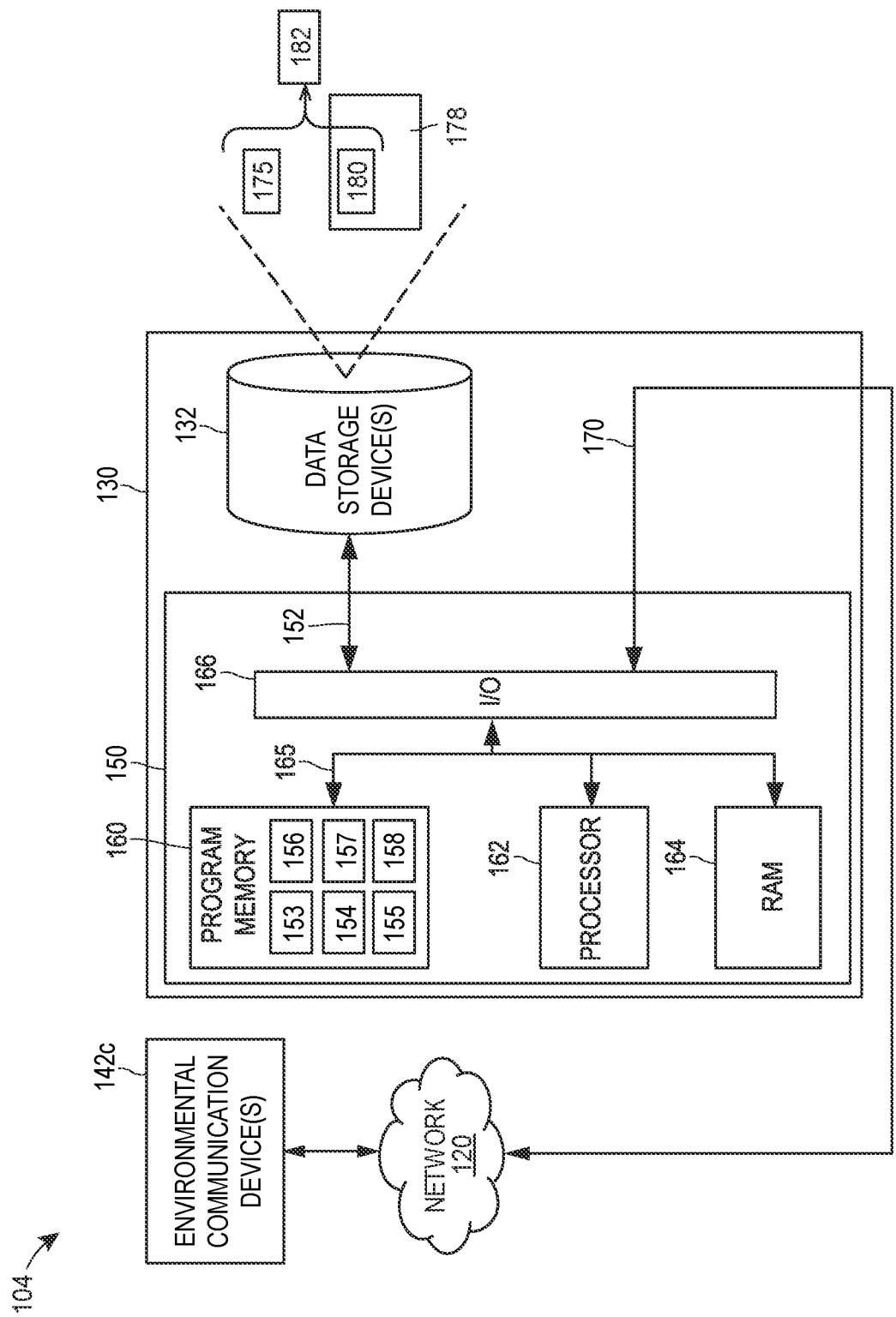
FIG. 1B illustrates a more detailed block diagram of the back-end components of the exemplary system shown in FIG. 1A.

FIG. 1B depicts a more detailed block diagram of the example back-end components 104 of the system 100. As shown in FIG. 1B, the remote computing system 130 included in the back-end components 104 may have a controller 150 that is operatively connected to the one or more data storage devices or entities 132 via a link 152, which may be a local or a remote link 152. It should be noted that, while not shown, additional data storage devices or entities may be linked to the controller 150 in a known manner. For example, separate databases may be used for various types of information, such as autonomous operation feature information, vehicle accidents, road conditions, vehicle insurance policy information, driver performance, or vehicle use information. Additional databases (not shown) may be communicatively connected to the remote computing system 130 via the network 120, such as databases maintained by third parties (e.g., weather, construction, or road network databases). The controller 150 may include one or more memories 160 (e.g., one or more program memories 160), one or more processors 162 (which may be called a microcontroller or a microprocessor), one or more random-access memories (RAMs) 164, and an input/output (I/O) circuit 166, all of which may be interconnected via an address/data bus 165. It should be appreciated that although only one microprocessor 162 is shown, the controller 150 may include multiple microprocessors 162. Similarly, the memory of the controller 150 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, optically readable memories, or biologically readable memories, for example. Generally speaking, the RAM 164 and/or the program memories 160 may respectively include one or more non-transitory, computer-readable storage media. The controller 150 may also be operatively connected to the network 120 via a link 170.

The remote computing system 130 may further include a number of software applications 153-158 stored in a program memory 160. The various software applications on the remote computing system 130 may include, for example, a vehicle monitoring application 153 for receiving sensor data (whether from on-board sensors 118 and/or from off-board sensors 148) indicative of the operating behavior of the vehicle 108 and/or of its driver, an environmental monitoring application 154 for receiving data (whether from on-board sensors 118, off-board sensors 148, and/or third party data feeds) indicative of changing environmental and contextual conditions in which the vehicle 108 is operating, a driver performance evaluation application 155 for determining a performance of the driver of the vehicle 108 during the changing environmental and contextual conditions, and a real-time communication application 156 for communicating information and/or instructions to the vehicle 108 (e.g., to the on-board computing device 110, the mobile device 112, and/or another computing device disposed at the vehicle 108), to other vehicles 115a-115n, and/or to other computing systems. Other applications at the remote computing system 130 may include, for example, an application for supporting autonomous and/or semi-autonomous vehicle operations 157 and/or one or more other applications 158 which may support vehicle operations (whether fully-, semi- or non-autonomous), vehicle context determination, and/or evaluation of driver performance. Generally speaking, the applications 153-158 may perform one or more functions related to evaluating driver performance based on the context in which the driver is operating the vehicle 108 and the driver's responses (temporal and otherwise) to changes in the context. For example, one or more of the applications 153-158 may perform at least a portion of any of the methods described herein.

The various software applications 153-158 may be executed on the same computer processor 162 or on different computer processors. Further, while the various applications 153-158 are depicted as separate applications, two or more of the applications 153-158 may be integrated as an integral application, if desired. In some embodiments, at least one of the applications 153-158 may be implemented in conjunction with another application (not shown) that is stored and executed at the remote computing system 130, such as a navigation application.

Additionally, it is noted that although the system 100 for determining driver performance 100 is shown in FIGS. 1A and 1B to include one vehicle 108, one mobile device 112, one on-board computer 110, and one remote computing system 130, it should be understood that different numbers of vehicles 108, mobile devices 112, on-board computers 110, and/or remote computing devices or servers 130 may be utilized. For example, the system 100 may include a plurality of servers 130 and hundreds or thousands of mobile devices 112 or on-board computers 110, all of which may be interconnected via the network 120. Furthermore, the database storage or processing performed by the one or more servers 130 may be distributed among a plurality of servers 130 in an arrangement known as "cloud computing." This configuration may provide various advantages, such as enabling near real-time uploads and downloads of information as well as periodic uploads and downloads of information. This may in turn support a thin-client embodiment of the mobile device 112 or on-board computer 110 discussed herein. Further, in some embodiments, any number of other vehicles 115a-115n may be communicatively connected to and/or included in the system 100, e.g., via the network 120.

Figure 2:
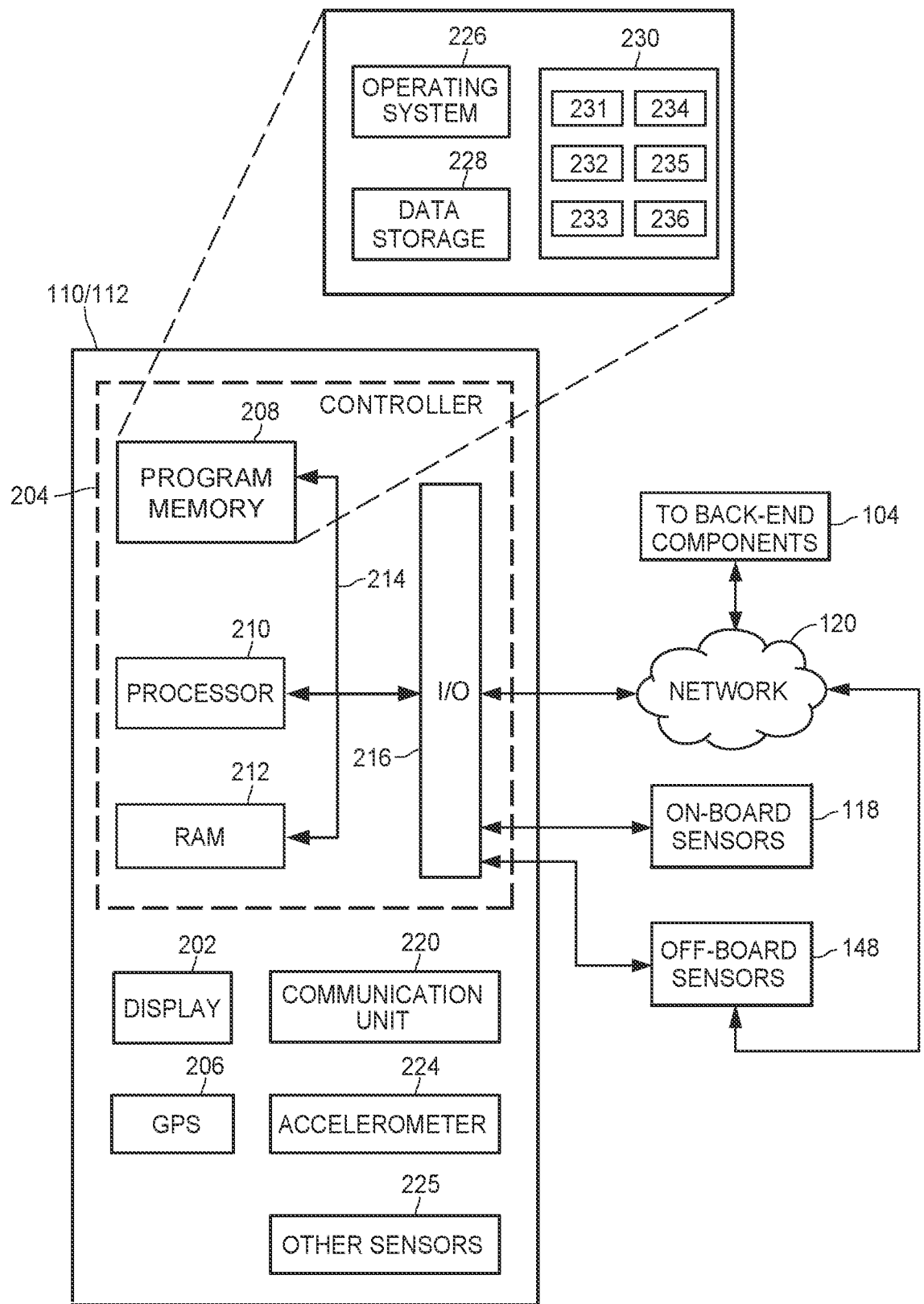
FIG. 2 illustrates a block diagram of an exemplary mobile device or on-board computing device that may operate in conjunction with the system of FIGS. 1A and 1B.

FIG. 2 illustrates a block diagram of an exemplary mobile device 112 or an exemplary on-board computer 110 consistent with the system 100. The mobile device 112 or on-board computer 110 may include a display 202, a GPS or other suitable geo-location unit 206, a communication unit 220, an accelerometer 224, one or more additional sensors 225, a user-input device (not shown), and/or a controller 204, which may be similar to the controller 150 of the remote computing system 130. In some embodiments, the mobile device 112 and on-board computer 110 may be integrated into a single device, or either may perform the functions of both. The on-board computer 110/mobile device 112 may interface with one or more on-board sensors 118 that are disposed at the vehicle 108 (but that are separate from the device 110/112) to receive information regarding the vehicle 108 and its environment. Additionally, the on-board computer 110/mobile device 112 may interface with one or more off-board sensors 148 to receive information regarding the vehicle 108 and its environment.

Similar to the controller 150, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, and/or a plurality of software applications 230. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for the on-board computer 110. The data storage 228 may include data such as user profiles and preferences, application data for the plurality of applications 230, and other data related to evaluating driver performance. In some embodiments, the controller 204 may also include, or otherwise be communicatively connected to, other data storage mechanisms (e.g., one or more hard disk drives, optical storage drives, solid state storage devices, etc.) that reside within the vehicle 108 and/or at the remote system 130.

As discussed with reference to the controller 150, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example. Generally speaking, the RAMs 212 and/or the program memories 208 may respectively include one or more non-transitory, computer-readable storage media.

The one or more processors 210 of the device 110/112 may be adapted and configured to execute any of one or more of the plurality of software applications 230 residing in the program memory 204, in addition to other software applications. The various software applications 230 of the device 110/112 may include, for example, a vehicle monitoring application 231 for receiving (whether from on-board sensors 118 and/or from off-board sensors 148) sensor data indicative of the operating behavior of the vehicle 108, an environmental monitoring application 232 for receiving (whether from on-board sensors 118, off-board sensors 148, and/or third party data feeds) data indicative of changing environmental and contextual conditions in which the vehicle 108 is operating, a driver performance evaluation application 233 for determining a performance of the driver of the vehicle 108 during the changing environmental and contextual conditions, and a real-time communication application 234 for communicating information and/or instructions to the vehicle 108 (e.g., to another computing device or system disposed at the vehicle 108), to other vehicles 115a-115n, to the remote computing system 130, to other back-end components 104 of the system 100 such as the environmental communication device 142c, and/or to other computing systems. Other applications that are executed at the device 110/112 may include, for example, an application for supporting autonomous and/or semi-autonomous vehicle operations 235 and/or one or more other applications 236 which may support vehicle operations (whether fully-, semi-, or non-autonomous), context determination, and/or evaluation of driver performance. Generally speaking, the applications 230 may perform one or more functions related to evaluating driver performance based on the context in which the driver is operating the vehicle 108 and the driver's responses (temporal and otherwise) to changes in the context. For example, one or more of the applications 230 may perform at least a portion of any of the methods described herein. In some embodiments, one or more of the applications 230 may operate in conjunction with one or more of the applications 153-158 at the remote computing system 130 to perform one or more functions related to evaluating driver performance based on the context in which the driver is operating the vehicle 108 and the driver's responses (temporal and otherwise) to changes in the context. For example, one or more of the applications 231-236 at the device 110/112 may be implemented as a thin-client that operates in conjunction with one or more of the applications 153-158 at the remote computing system.

The various software applications 230 may be executed on the same computer processor 210 or on different computer processors. Further, while the various applications 231-236 are depicted as separate applications, two or more of the applications 231-236 may be integrated as an integral application, if desired. In some embodiments, at least one of the applications 231-236 may be implemented in conjunction with another application (not shown) that is stored and executed at the device 110/112, e.g., a navigation application, a user interface application, etc.

In addition to the communicative connections to the on-board sensors 118 that are disposed at the vehicle 108 but not at, on, or within the device 110/112 itself, the device 110/112 may include additional on-board sensors 118 that are integral with the device 110/112, such as the GPS unit 206 and/or the accelerometer 224, which may provide information regarding the operation of the vehicle 108. Such integral sensors 118 may further include one or more sensors of a sensor array 225, which may include, for example, one or more cameras, additional accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, direction, and/or other parameters associated with movements of the vehicle 108.

Furthermore, the communication unit 220 of the device 110/112 may communicate with other vehicles 115a-115n, infrastructure or environmental components 142, 145, back-end components 104, or other external sources of information to transmit and receive information relating to evaluating driver performance. For example, the communication unit 220 may be included in or may include one or more of the communication components 135a, 135b shown in FIG. 1A. Additionally or alternatively, the communication unit 220 may be included in or may include an instance of the environmental communication component 142 shown in FIG. 1A. The communication unit 220 may communicate with the external sources via the network 120 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Further, the communication unit 220 may provide input signals to the controller 204 via the I/O circuit 216. The communication unit 220 may also transmit sensor data, device status information, control signals, or other output from the controller 204 to one or more sensors 118 within the vehicle 108, mobile devices 112, on-board computers 110, off-board sensors 148, environmental communication devices 142, and/or remote servers 130.

Further, the mobile device 112 or the on-board computer 110 may include a user-input device (not shown) for receiving instructions or information from the vehicle operator, such as settings, selections, acknowledgements, etc. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Figure 3:
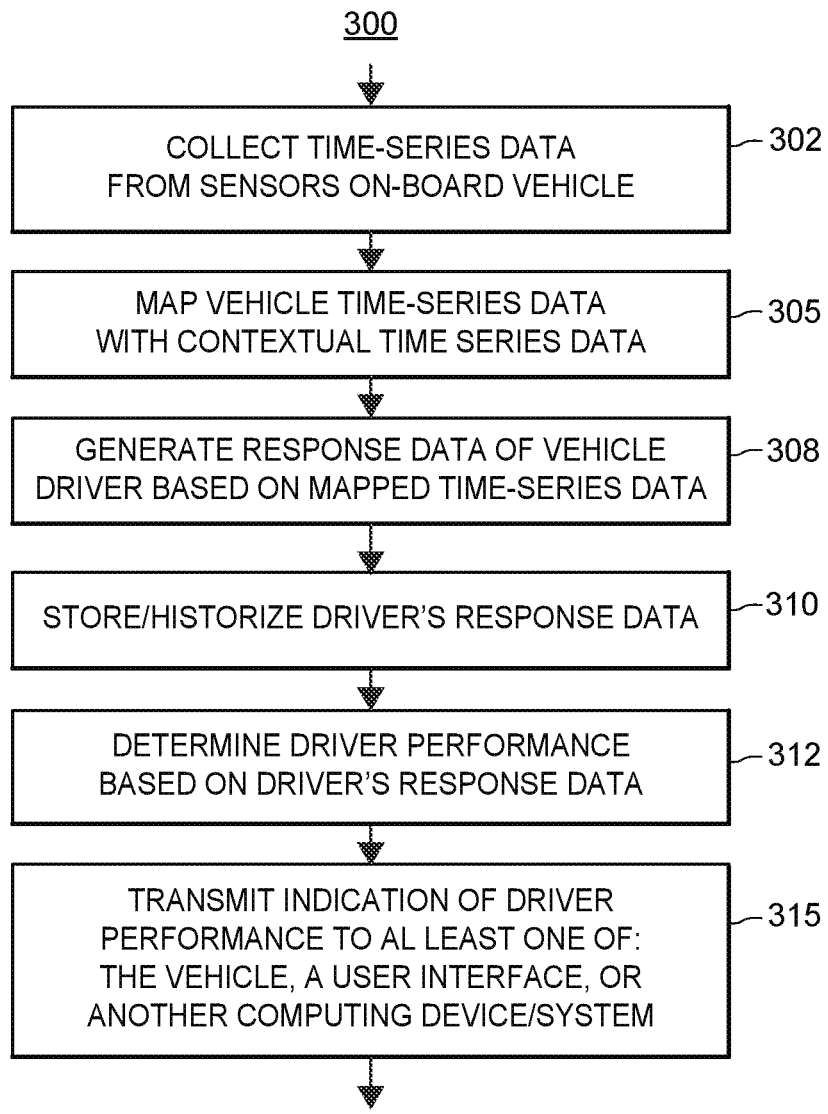
FIG. 3 illustrates a flow diagram of an exemplary method for determining vehicle driver's performance.

FIG. 3 depicts a flow diagram of an exemplary method 300 for determining the performance of a driver of a vehicle, such as the vehicle 108 of FIG. 1A. At least a portion of the method 300 may be performed by the system 100 of FIGS. 1A and 1B, for example, by the on-board computer 110, the on-board mobile device 112, and/or the remote computing devices 130. For ease of discussion, and not for limitation purposes, the method 300 is discussed with simultaneous reference to the system 100, although it is understood that the method 300 may operate in conjunction with other systems and/or computing devices.

At a block 302, the method 300 may include collecting time-series data from one or more sensors that are disposed on-board a vehicle, such as the vehicle 108. Generally speaking, the time-series data collected from the one or more sensors disposed on-board the vehicle (e.g., the on-board sensors 118) may include data indicative of a temporal behavior of the driver, and/or a temporal behavior or condition of the vehicle while being operated by a driver. For example, the time-series data collected at the block 302 may be indicative of a vehicle's change over time in position, speed, acceleration, direction, and responsiveness to controls. Additionally or alternatively, the time-series data collected at the block 302 may include data that is indicative of the context of the vehicle's interior and any changes over time thereto, e.g., indicative of users and/or human presence within the vehicle 108, such as data indicative of in-cabin temperatures, in-cabin noise levels, data from seat sensors (e.g., indicative of whether or not a person is using a seat, and thus the number of passengers being transported by the vehicle 108), data from seat belt sensors, data regarding the operations of user controlled devices such as windshield wipers, defrosters, traction control, mirror adjustment, interactions with on-board user interfaces, etc. Still additionally or alternatively, the time-series data collected at the block 302 may include data that is indicative of the context of the vehicle's external environment and any changes over time therein, e.g., data indicative of weather changes, road conditions, traffic congestion, obstacles, signage, etc. Accordingly, the time-series data may be collected from one or more on-board sensors 118 directed to the operations of the vehicle 108, one or more on-board sensors 118 that are directed towards the interior of the vehicle 100 and/or one or more on-board sensors 118 that are directed towards the environment external to the environment, such as described above with respect to FIGS. 1A and 1B. The one or more on-board sensors 118 may be fixedly connected or attached to the vehicle 108, and/or may be fixedly connected, attached, or included in one or more mobile devices 112 being transported by the vehicle 108. Typically, each data point of the vehicle time-series data includes an indication of the respective geo-location and respective time at which the data point was collected. The collected time-series data may be stored, for example, at a memory of an on-board computer 110, at a memory of the mobile device 112, at the one or more remote data storage devices 132, and/or at other memories of the system 100.

At a block 305, the method 300 may include mapping the collected time-series data with contextual time-series data. The contextual time-series data may include historical and current data that is indicative of environmental contexts in which multiple vehicles have traveled and are traveling, e.g., along multiple routes and multiple periods of time, and may include data indicative of static and/or dynamic contextual conditions corresponding thereto. In particular, the contextual time-series data may include data that is indicative of the environment and context in which the vehicle 108 is operating or has operated, and changes thereto over time. For example, the contextual time-series data may include data that is indicative of the weather, road conditions, road configurations (e.g., merging lanes, construction zones, etc.), traffic density, pedestrian density, density of other humans (e.g., cyclists, skateboarders, etc.), posted speed limits and other traffic signs/lights, school zones, railroad tracks, etc. As described above, at least a portion of the contextual time-series data may be provided by one or more on-board sensors 118 of the vehicle 108. Additionally or alternatively, at least a portion of the contextual time-series data may be generated by and/or collected from multiple sets of sensors 148 associated with multiple vehicles 115a-115n (e.g., on-board sensors 118 and/or off-board sensors 148 of the vehicles 115a-115n), e.g., over multiple intervals of time. Additionally, at least a portion of the contextual-time series data may be generated by and received from one or more third party sources that are communicatively connected to the system 100, e.g., a weather database or system, a traffic congestion database or system, a construction database or system, a road network database or system, an IoT (Internet-of-Things) or sensor system implemented in a city or other jurisdiction, etc. The contextual time-series data may be stored at the one or more data storage devices 132 and/or other memories of the system 100. Each data point included in the contextual time-series data may have a respective timestamp and indication of a respective geo-location associated therewith, which may be indicative of the time and geo-location at which the respective data point was collected or obtained. As such, mapping the collected vehicle time-series data and the contextual time-series data (block 305) may include aligning both sets of time-series data based on their respective timestamps and geo-locations, in an embodiment.

At a block 308, the method 300 may include generating a set of driver response data based on the mapped time-series data. The driver response data may include data that is indicative of a driver's response (temporal characteristic of the response, content of response, and/or magnitude of response) to contextual changes in the vehicle's environment. That is, the driver response data may be descriptive of how quickly and how forcefully a driver responds to compensate for different types of changes that occur in the vehicle's environment. For example, in an embodiment, the block 308 may include identifying a time at which a change in the context of the vehicle's environment occurred, and identifying, based on the mapped time-series data, a corresponding change in the operating behavior of the driver and/or of the vehicle. For example, a number, respective types, and respective magnitudes of driver and/or vehicle responses to the contextual change may be determined, and respective elapsed time intervals between the occurrence of the contextual change and the initiation of the response(s) may be determined. Accordingly, based on the analysis or processing of the mapped time-series data, a new set of data, i.e., the driver response data, is generated or created.

At a block 310, the generated driver response data may be stored or historized. In an embodiment, the generated driver response data may be stored at the one or more data storage devices 132 and/or other memories of the system 100.

At a block 312, an indication of the driver's performance may be determined based on the driver response data. In an embodiment, the block 312 may include comparing the driver response data to one or more thresholds that are indicative of a preferred level of safety or appropriateness to determine the driver's level of performance. The one or more thresholds may be predetermined, may be configurable, and may be stored at the one or more data storage device 132 and/or in another memory of the system 100. Generally speaking, the one or more thresholds may correspond to or indicate a level of safety or level of appropriateness of driver response(s) to various changes in driving conditions. That is, the one or more thresholds may define a safe or appropriate type or types of driver response(s), respective magnitudes of the type(s) of driver response(s), respective time-to-respond of the type(s) of driver response(s), and/or combinations of multiple safe and/or appropriate driver responses. For example, an appropriate time-to respond and magnitude of the response to an accident that has occurred on the road ahead of the vehicle 108 (and therefore, corresponding thresholds) may differ based on road conditions such as whether or not the road is dry, wet, or icy. In another example, different combinations of driver responses to avoiding debris on a roadway may be safer or more appropriate for different conditions, e.g., the road conditions at the time, whether or not the road has a shoulder or guard rail, how many lanes of travel are available on the roadway, the traffic density, etc., and thus may be reflected by different thresholds.

At a block 315, the method 300 may include transmitting or providing an indication of or corresponding to the determined level of driver performance to at least one of the vehicle 108, a user interface, or another computing device or system. The transmitted indication may be, for example, an alert, warning, or notification to the driver of the vehicle 108, to drivers of nearby vehicles 115a-115n, and/or to other vehicles 115a-115n that are operating in the vicinity of the vehicle 108. An indication of the alert, warning, or notification may be presented on a user interface disposed at the receiving vehicle 108, 115a-115n, e.g., at an on-board user interface of the receiving vehicle, and/or at a user interface of an on-board mobile device 112. The indication may include an indication of the driver's level of performance and/or one or more suggested actions that may be performed at the receiving vehicle to mitigate effects of the determined driver performance, in some scenarios.

In some embodiments, the transmitted indication corresponding to the determined level of driver performance may include an instruction that is to be executed by a computing device on-board the receiving vehicle 108, 115a-115n to automatically modify an operation of the receiving vehicle 108, 115a-115n. For example, if the receiving vehicle is operating in a fully or partially autonomous mode, and/or if a driver of the receiving vehicle has given permission for at least certain modifications to vehicle operations to be automatically performed, the transmitted indication may automatically cause a change or modification in one or more operating behaviors of the receiving vehicle 108, 115a-115n, such as a decrease in rate of speed, a change in steering, a lowering of radio volume, etc.

In some embodiments, the transmitted indication corresponding to the determined level of driver performance may be received by another computing system that is not disposed at any vehicle. For example, the transmitted indication may be received (e.g., via one or more of the environmental communication devices 142) by a computing system that automatically controls aspects of the infrastructure, e.g., by changing stop light colors at an intersection, providing dynamic warnings displayed on highway signs, etc., and such a computing system may send one or more commands to control the behavior of various infrastructure components (e.g., lights, warning signals, etc.) based on the contents of the transmitted indication.

In some embodiments, the transmitted indication may be provided to another computing system for processing or use in other applications. For example, the transmitted indication of the driver's performance may be transmitted to a computing system of an insurance company, and the determined driver's performance may be utilized to determine and/or modify an amount of risk associated with the driver, which may in turn be utilized to determine an amount of an insurance premium, the amount of a deductible, and/or the creation and/or modification of these and/or other financial terms associated with obtaining or maintaining an insurance policy for the driver and/or for the vehicle 108.

In an embodiment, at least a portion (and in some cases, all) of the method 300 may be executed in real-time. That is, while a driver is traversing a particular route, the method 300 may determine the driver's on-going, current, or real-time performance while operating the vehicle on that particular route and provide suggestions to the driver (e.g., via a user interface disposed at the vehicle) for one or more driving modifications while he or she is operating the vehicle over the particular route (e.g., slow down to a certain speed, turn on your headlights, etc.). Additionally or alternatively, based on the driver's on-going or real-time performance, the method 300 may provide one or more instructions to the vehicle to automatically modify an operating behavior of the vehicle while the driver is operating the vehicle over the particular route. For example, if the driver has opted-in, given permission for, or otherwise assented to various automatic vehicle operations, based on the determination of the driver's performance, the method 300 may include instructing the vehicle to automatically change some aspect of its operation while traversing the particular route, e.g., automatically turn on traction control, automatically turn down the radio volume, etc.

Figure 4:
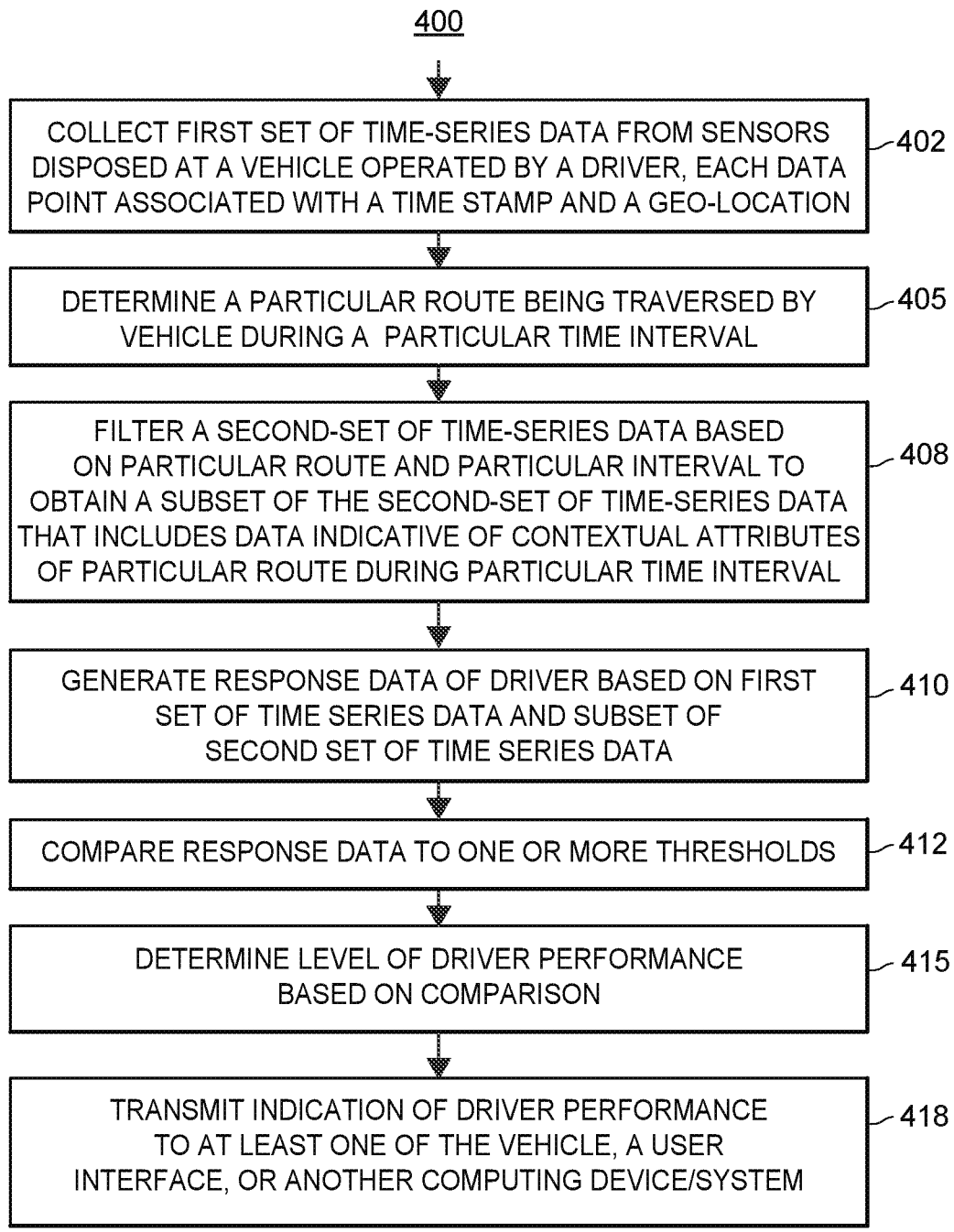
FIG. 4 illustrates a flow diagram of an exemplary method for determining vehicle driver's performance.

FIG. 4 depicts a flow diagram of an exemplary method 400 for determining a vehicle driver's performance. At least a portion of the method 400 may be performed by the system 100, for example, by the on-board computer 110, the on-board mobile device 112, and/or the remote computing system 130. In some embodiments, at least a portion of the method 400 may be performed in conjunction with one or more portions of the method 300. For ease of discussion, and not for limitation purposes, the method 400 is discussed with simultaneous reference to the system 100, although it is understood that the method 400 may operate in conjunction with other systems and/or computing devices.

At a block 402, the method 400 may include collecting a first set of time-series data from sensors that are associated with a vehicle being operated by a driver, such as the vehicle 108. Typically, the first set of time-series data includes data that is indicative of the operating behavior of the vehicle 108 over time. For example, the first set of time-series data may include data that is generated by one or more sensors 118 that are disposed on-board the vehicle, and that is indicative of the movement and other behaviors of the vehicle 108 over time. The on-board vehicle sensors may be fixedly attached to the vehicle and/or to one or more mobile devices 112 disposed at the vehicle 108, for example. Additionally or alternatively, the first set of time-series data may include data generated by one or more environmental sensors 118 that are disposed separately from and externally to the vehicle 108 within the environment in which the vehicle is traveling, for example, sensors that are disposed at or on infrastructure components 145 and/or at or on other vehicles 115a-115n within the environment in which the vehicle 108 is traveling. The data that is generated by the one or more environmental sensors 118 may include data that is indicative of the movement and other behaviors of the vehicle 108 over time. Each data point included in the collected first set of time-series data may have a respective timestamp and indication of a respective geo-location associated therewith, which may be indicative of the time and geo-location at which the respective data point was collected or obtained. For example, for data points that are based on data generated by on-board vehicle sensors, respective timestamps may be generated by on-board clocks or timing devices, and respective geo-locations may be generated by respective on-board GPS devices. In an embodiment, the collected first set of time-series data indicative of the operating behavior of the vehicle 108 over the particular route and particular time interval may be stored, e.g., at the one or more data storage devices 132 of the back-end components 104 of the system 100. For example, in FIGS. 1A and 1B, the collected first set of time-series data is represented by the reference 175.

At a block 405, the method 400 may include determining a particular route or path of travel that is being traversed by the vehicle 108 during a particular interval of time. In some embodiments, data generated by on-board clocks or timing devices in conjunction with on-board GPS devices may be utilized to determine the particular or route or path of travel of the vehicle over the particular interval of time. In some embodiments, a mapping application disposed at the vehicle 108 and/or at the remote computing system 130 may determine the route or path traveled by the vehicle 108 during the particular interval of time, for example, at least partially based on data generated by on-board timing and geo-location devices.

At a block 408, the method 400 may include filtering a second set of time-series data based on the particular route and the particular interval of time to obtain a subset of the second set of time-series data. The second set of time-series data may include historical and current data that is indicative of static and temporal contextual or environmental conditions of a multiplicity of routes over a multiplicity of time intervals, and may include time-series data indicative of static and temporal contextual or environmental conditions of the route via which the vehicle 108 is traveling or has traveled. For example, the second set of time-series data may include data that is indicative of weather, road conditions, road configurations (e.g., merging lanes, construction zones, etc.), traffic density, pedestrian density, density of other humans (e.g., cyclists, skateboarders, etc.), posted speed limits and other traffic signs/lights, school zones, railroad tracks, etc. along multiple routes and over multiple time intervals. As discussed above, at least a portion of the second set of time-series data may be provided by one or more on-board sensors 118 of the vehicle 108. Additionally or alternatively, at least a portion of the second set of time-series data may be provided by multiple sets of sensors 118 associated with multiple vehicles 115a-115n (e.g., on-board sensors 118, environmental sensors 148 associated with the vehicles 115a-115n over multiple intervals of time. Additionally, at least a portion of the contextual-time series data may be provided by one or more third party sources that are communicatively connected to the system 100, e.g., a weather database or system, a traffic congestion database or system, a construction database or system, a road network database or system, an IoT (Internet-of-Things) or sensor system implemented in a city or other jurisdiction, etc. Each data point included in the second set of time-series data may have a respective timestamp and indication of a respective geo-location associated therewith, which may be indicative of the time and geo-location at which the respective data point was collected or obtained. In an embodiment, the second set of time-series data may be stored on the one or more data storage devices 132 of the back-end components 104 of the system 100. For example, in FIGS. 1A and 1B, the second set of time-series data indicative of static and temporal conditions of routes is represented by the reference 178.

The second set of time-series data 178 may be filtered, based on the particular route over which the vehicle 108 traveled during the particular interval of time (e.g., as determined at the block 405), to obtain the subset of the second set of time-series data corresponding to the particular route and the particular interval of time, e.g., as represented in FIGS. 1A and 1B by the reference 180. As such, the subset 180 of the second set of time-series data 178 may include data that is indicative of contextual attributes of the particular route traveled by the vehicle 108 during the particular time interval. That is, the subset 180 of the second set of time-series data 178 may be descriptive of changes in the conditions of the particular route traversed by the vehicle 108 during the particular time interval, including static changes as well as time-sensitive changes. Examples of static changes along the particular route may include, for example, a change in speed limit, a change in number of lanes, a school zone, and the like. Examples of time-sensitive or dynamic changes along the particular route during the particular time interval may include, for example, the start of a rain or snow storm, an icing of a road surface, an accident that occurs ahead of the vehicle 108 during the particular time interval, the presence of an emergency vehicle, etc.

At a block 410, the method 400 may include generating driver response data corresponding to the particular route in the particular interval of time. The driver response data may include data that is indicative of a driver's response over time to changes in the context in the particular route over which the vehicle 108 is driven during the particular time interval (if any). That is, the driver response data may be descriptive of how quickly and how forcefully a driver responds to different types of changes that occur in the driving context or environment of the particular route during the particular time interval. In an embodiment, the block 410 may include time-aligning the first set of time-series data 175 corresponding to the sensed vehicle behavior over the particular route during the particular time interval with the subset 180 of the second set of time-series data 178 indicative of the contextual attributes of the particular route during the particular time interval. Based on the time-aligned data, the block 410 of the method 400 may include determining a time at which a change in context and/or conditions that occurred while the vehicle 108 was traversing the particular route during the particular time interval, and determining the type of, timing of, and/or magnitude of the driver's response to the change (if any). Such data including the type of, timing of, magnitude of, and/or other aspects of the driver's response to contextual changes is generally referred to herein as "driver response data." The generated driver response data may be stored, for example, at the one or more data storage devices 132 of the back-end components 104 of the system 100, e.g., as represented in FIGS. 1A and 1B by the reference 182.

Generating the driver response data 182 (block 410) may include, for example, determining an amount of time that elapses between the occurrence of the context change and a change in the behavior of vehicle operations that is initiated by the driver (e.g., braking, steering, changing speeds, turning down the radio, turning on exterior lighting, etc.), which may be referred to herein as the driver's time-to-respond. Additionally or alternatively, generating the driver response data 182 may include determining a type and optionally a magnitude of the driver's response, for example, how forcefully the driver stepped on the brakes, what degree of steering change was applied, how far down the radio volume was turned down from the initial volume, etc. Generally speaking, generating the driver response data (block 410) includes transforming at least two sets of time-series data (e.g., the first set of time-series data 175 corresponding to sensed vehicle behavior and the subset 180 filtered from the second set of time-series data 178 corresponding to contextual information) into a new set of time-series data 182 that provides new information that is indicative of a driver's performance while operating vehicle 108 over the particular route during the particular time interval.

In some embodiments, additional types of data (e.g., time-series data or other types of data) may be utilized at the block 410 to determine the driver response data 182. For example, in addition to providing data indicative of vehicle operating behaviors, the on-board sensors 118 may provide data indicative of a vehicle's operating condition (e.g., quality of oil, amount of tire tread, the degree of plugging or other compromise of fuel injectors, etc.), which may be utilized in conjunction with the first set of time-series data 175 and the subset 180 of the second set of time-series data 178 to generate the driver response data 182. In another example, the onboard sensors 118 may provide data indicative of a driver's physical/biometric behavior while operating the vehicle 108, which may be utilized in conjunction with the other types of time-series data to determine the driver response data 182. For example, the on-board sensors 118 may provide data indicative of the driver's eye movements; whether and when the driver has one hand, two hands, or no hands on the steering wheel; whether and when the driver manipulates a mobile phone or other user interface disposed in the vehicle 108; and the like.

The generated driver response data 182 (block 410) may be stored, e.g., at the one or more data storage devices 132 included in the back-end components 104. In an embodiment (not shown), the method 400 may include augmenting the second set of time-series data 178 that is indicative of static and temporal conditions of a multiplicity of routes or multiplicity of time intervals with the newly generated driver response data 182, e.g., for use in evaluating another driver's performance at a later time.

At a block 412, the method 400 may include comparing the driver's response data 182 to one or more thresholds. The one or more thresholds may be predetermined, may be configurable, and may be stored at the one or more data storage device 132 and/or in another memory of the system 100. Generally speaking, the one or more thresholds may correspond to a level of safety or level of appropriateness of driver response to various changes in driving conditions. That is, the one or more thresholds may define a safe or appropriate type or types of driver responses, respective magnitudes of the type(s) of driver responses, respective time-to-respond of the type(s) of driver responses, and/or combinations of multiple safe and/or appropriate responses. For example, an appropriate time-to respond and magnitude of the response to an accident that has occurred on the road ahead of the vehicle 108 (and therefore, corresponding thresholds) may differ based on road conditions such as whether or not the road was dry, wet, or icy. In another example, various combinations of driver responses to avoiding debris on the roadway may be safer or more appropriate for different conditions, e.g., the road conditions at the time, whether or not the road has a shoulder or guard rail, how many lanes of travel are available on the roadway, the traffic density, etc., and thus may be reflected by different thresholds.

At a block 415, the method 400 may include determining, based on the comparison of the block 412, a level of driver performance for the particular route and the particular time interval. The level of driver performance may correspond to, for example, a magnitude of a distance of the driver response data 182 from the one or more thresholds, and/or a direction of the distance, such as whether or not the driver response data 182 exceeded or did not meet the one or more thresholds. The determined level may be represented in any suitable manner, e.g., by a category, a rating, a numerical value, an alphanumeric value, a range, a probability, etc. In an embodiment, the blocks 412 and 415 may be implemented by using a statistical model. For example, one or more statistical analyses and/or machine learning techniques may be applied to the second set of time-series data 178 to determine and/or learn the particular types (whether individually or in combination) and times-to-response that correspond to various levels of safety and/or appropriateness for various contextual changes. For example, the application of one or more statistical analyses and machine learning techniques may generate respective weightings of response types and durations of times-to-respond for various contextual changes that occur in a mutually exclusive manner or in a related manner. The learned knowledge generated from the application of the statistical analyses and/or machine learning techniques may be represented by a statistical model, which may be stored at the one or more data storage devices 132, in an embodiment. Accordingly, in said embodiment, the blocks 412, 415 may include applying the statistical model to at least some of the driver response data 182, and receiving, as a resultant output, the indication of the level of driver performance. In some embodiments, the at least some of the driver response data 182 is input into the statistical model in conjunction with at least portions of the first set of time-series data, the second set of time-series data, and/or the mapped time-series data to thereby generate, as a resultant output, the indication of the level of driver performance.

In some embodiments, the statistical model may be generated a priori, and thus may be readily available for application to the generated driver response data 182. In some embodiments, the statistical model may be generated in real-time, that is, upon receiving the generated driver response data 182, the one or more statistical analyses and/or machine learning techniques may be applied to available, historical time-series data 178 to generate the statistical model, and the received driver response data 182 may be input into the model generated in real-time to determine the driver's performance level.

Of course, implementations of the blocks 412, 415 other than using statistical models may be additionally or alternatively utilized in embodiments of the method 400. For example, direct or deterministic comparisons and categorization techniques may be utilized to implement the block 412 and/or the block 415.

At a block 418, the method 400 may include transmitting or providing an indication of or corresponding to the determined level of driver performance to at least one of the vehicle 108, a user interface, or another computing device or system. The transmitted indication may be, for example, an alert, warning, or notification to the driver of the vehicle 108, to drivers of nearby vehicles 115a-115n, and/or to autonomous vehicles 115a-115n that are operating in the vicinity of the vehicle 108. An indication of the alert, warning, or notification may be presented on a user interface disposed at the receiving vehicle 108, 115a-115n, e.g., at an on-board user interface of the receiving vehicle, and/or at a user interface of an on-board mobile device 112. The indication may include one or more suggested actions that may be performed at the receiving vehicle to mitigate effects of the determined driver performance, in some scenarios.

In some embodiments, the transmitted indication corresponding to the determined level of driver performance may include an instruction that is to be executed by a computing device on-board the receiving vehicle 108, 115a-115n to automatically modify an operation of the receiving vehicle 108, 115a-115n. For example, if the receiving vehicle is operating in a fully or partially autonomous mode, and/or if a driver of the receiving vehicle has indicated that at least certain modifications to vehicle operations may be automatically performed, the transmitted indication may automatically cause a change or modification in one or more operating behaviors of the receiving vehicle 108, 115a-115n, such as a decrease in rate of speed, a change in steering, etc.

In some embodiments, the transmitted indication corresponding to the determined level of driver performance may be received by another computing system that is not disposed at any vehicle. For example, the transmitted indication may be received by a computing system that automatically controls aspects of the infrastructure, e.g., by changing stop light colors at an intersection, providing dynamic warnings displayed on highway signs, etc., and such a computing system may send one or more commands to control the behavior of various infrastructure components (e.g., lights, warning signals, etc.) based on the contents of the transmitted indication.

In some embodiments, the transmitted indication may be provided to another computing system for processing and/or use in other applications. For example, the transmitted indication of the driver's performance may be transmitted to a computing system of an insurance company, and the determined driver's performance may be utilized to determine and/or modify an amount of risk associated with the driver, which may in turn be utilized to determine an amount of an insurance premium, the amount of a deductible, and/or the creation and/or modification of these and/or other financial terms associated with obtaining or maintaining an insurance policy for the driver and/or for the vehicle 108.

It is noted that in some embodiments, some or all of the method 400 may be executed in real-time. That is, while a driver is traversing a particular route, the method 400 may execute to determine the driver's on-going, current, or real-time performance on that particular route and provide suggestions to the driver (e.g., via a user interface disposed at the vehicle) for one or more driving modifications while he or she is operating the vehicle over the particular route (e.g., slow down to a certain speed, turn on your headlights, etc.). Additionally or alternatively, based on the driver's on-going or real-time performance, the method 400 may execute to provide one or more instructions to the vehicle while the driver is operating the vehicle over the particular route. For example, if the driver has opted-in, given permission for, or assented to various automatic vehicle operations, based on the determination of the driver's performance, the method 400 may include instructing the vehicle to automatically change some aspect of its operation while traversing the particular route, e.g., automatically turn on traction control, automatically turn down the radio volume, etc.

In some aspects of the systems, methods, and techniques described herein, the driver may opt-in to a rewards, loyalty, discount, or other program. For example, the driver may allow the remote computing system 130 to collect sensor, telematics, vehicle, mobile device, driver performance, and other types of data discussed herein. With customer permission or affirmative consent, the data collected may be analyzed (whether by the remote computing system 130 or by another computing system that is communicatively connected to the remote computing system 130) to provide certain benefits to the driver. For instance, insurance cost savings may be provided to the driver based on his or her contextual driving performance. Recommendations that lower risk or provide cost savings to the driver may also be generated and provided to customers based upon data analysis.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Moreover, the systems and methods described herein are directed to an improvement to computer functionality and improve the functioning of conventional computers.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. A method comprising:
accessing a first set of time-series data collected by a set of sensors associated with a vehicle being operated by a driver during a first time period;
accessing a second set of time-series data representing attributes of an environment in which the vehicle was operating while the first set of time-series data was collected;
generating a set of response data indicative of responses of the driver to one or more changes of the attributes of the environment that occurred while the driver was operating the vehicle during the first time period, the set of response data including data indicative of respective elapsed time intervals between corresponding data points in the first set of time-series data and the second set of time-series data; and
generating, based on the set of response data, an indication of a level of performance of the driver, wherein the level of performance corresponds to one or more of the attributes of the environment represented in the second set of time-series data.

2. The method of claim 1, wherein the set of response data further includes data indicative of at least one of respective magnitudes of first responses corresponding to first data points in the second set of time-series data or respective contents of second responses corresponding to second data points in the second set of time-series data.

3. The method of claim 1, further comprising determining a route of travel of the vehicle during the first time period, wherein accessing the second set of time-series data comprises filtering the second set of time-series data based at least in part on the route of travel to determine the attributes of the environment.

4. The method of claim 1, wherein at least one sensor of the set of sensors is a sensor of a personal electronic device corresponding to the driver and disposed in the vehicle.

5. The method of claim 1, further comprising transmitting, to the vehicle via a wireless communication channel, an instruction to automatically modify a behavior of an on-board computer disposed at the vehicle that controls one or more operational behaviors of the vehicle.

6. The method of claim 1, wherein generating the indication of the level of performance comprises determining that one or more time intervals represented in the data indicative of the respective elapsed time intervals meet or exceed a threshold time interval associated with the level of performance.

7. The method of claim 1, wherein generating the indication of the level of performance comprises determining that one or more magnitudes of responses represented in the set of response data meet or exceed a threshold magnitude of response associated with the level of performance.

8. The method of claim 1, further comprising transmitting at least one of the indication of the level of performance of the driver or a suggested driving behavior to a personal electronic device corresponding to the driver.

9. The method of claim 1, wherein at least a subset of the second set of time-series data is collected by at least one sensor of a personal electronic device corresponding to the driver.

10. A non-transitory computer-readable medium comprising instructions that, when executed by one or more processors, cause the one or more processors to:
access a first set of time-series data collected by a set of sensors associated with a vehicle being operated during a first time period;
access a second set of time-series data representing attributes of an environment in which the vehicle was operating while the first set of time-series data was collected;
generate a set of response data indicative of responses of a vehicle operator to one or more changes of the attributes of the environment that occurred while the vehicle operating during the first time period, the set of response data including data indicative of respective elapsed time intervals between corresponding data points in the first set of time-series data and the second set of time-series data; and
generate, based on the set of response data, an indication of a level of performance of the vehicle operator, wherein the level of performance corresponds to a one or more of the attributes of the environment represented in the second set of time-series data.

11. The non-transitory computer-readable medium of claim 10, wherein the set of response data further includes data indicative of at least one of respective magnitudes of responses corresponding to the data points in the second set of time-series data or respective contents of responses corresponding to the data points in the second set of time-series data.

12. The non-transitory computer-readable medium of claim 10, wherein the instructions, when executed by the one or more processors, cause the one or more processors to generate the indication of the level of performance by applying a model based at least in part on historical data indicative of multiple vehicle operators' respective responses to at least one of the first set of time-series data, the second set of time-series data, or the set of response data to determine the indication of the level of performance of the vehicle operator.

13. The non-transitory computer-readable medium of claim 10, wherein the set of sensors includes at least one of a camera, another type of optical sensor, a speed sensor, a noise sensor, a heat sensor, an accelerometer, another type of force sensor, a location tracking sensor, a proximity sensor, or a geo-positioning sensor.

14. The non-transitory computer-readable medium of claim 10, further comprising instructions that, when executed by the one or more processors, cause the one or more processors to:
apply a model based at least in part on historical data indicative of multiple vehicle operators' respective responses to at least one of the first set of time-series data, the second set of time-series data, or the set of response data to determine at least one of a suggested driving behavior or an indication of an instruction that is to be provided to the vehicle to automatically modify an operation of a subsystem of the vehicle to modify one or more operational behaviors of the vehicle; and
transmitting an indication of the suggested driving behavior or the indication of the instruction to at least one of the vehicle or a personal electronic device corresponding to the vehicle operator.

15. The non-transitory computer-readable medium of claim 10, wherein the instructions that, when executed by the one or more processors, cause the one or more processors to access the second set of time-series data comprise instructions that, when executed by the one or more processors, cause the one or more processors to filter the second set of time-series data based at least in part on the first time period.

16. A system comprising:
one or more processors; and
a non-transitory memory storing computer-executable instructions that, when executed, cause the one or more processors to:
- access a first set of time-series data collected by a set of sensors associated with a vehicle being operated during a first time period;
- access a second set of time-series data representing attributes of an environment in which the vehicle was operating while the first set of time-series data was collected;
- generate a set of response data indicative of responses of a vehicle operator to one or more changes of the attributes of the environment that occurred while the vehicle operating during the first time period, the set of response data including data indicative of respective elapsed time intervals between corresponding data points in the first set of time-series data and the second set of time-series data; and
- generate, based on the set of response data, an indication of a level of performance of the vehicle operator, wherein the level of performance corresponds to one or more of the attributes of the environment represented in the second set of time-series data.

17. The system of claim 16, wherein the first set of time-series data comprises data representing at least one of a change in position of the vehicle, a change in speed of the vehicle, a change in acceleration of the vehicle, a change in responsiveness to controls of the vehicle, an in-cabin temperature, an in-cabin noise level, seat usage, seat belt usage, or vehicle device usage.

18. The system of claim 16, wherein the second set of time-series data comprises data representing at least one of a weather condition, a road condition, a road congestion, a traffic condition, a road topography, a speed limit, a jurisdictional sign, or another environmental condition.

19. The system of claim 16, wherein the instructions, when executed, further cause the one or more processors to generate the indication of the level of performance further based at least in part on one or more thresholds associated with one or more respective environmental conditions represented in the first set of time-series data.

20. A system for determining driver performance, the system comprising:
- means for accessing a first set of time-series data collected by a set of sensors associated with a vehicle being operated by a driver during a first time period;
- means for accessing a second set of time-series data representing attributes of an environment in which the vehicle was operating while the first set of time-series data was collected;
- means for generating a set of response data indicative of responses of the driver to one or more changes of the attributes of the environment that occurred while the driver was operating the vehicle during the first time period, the set of response data including data indicative of respective elapsed time intervals between corresponding data points in the first set of time-series data and the second set of time-series data; and
- means for generating, based on the set of response data, an indication of a level of performance of the driver, wherein the level of performance corresponds to a particular one of the attributes of the environment represented in the second set of time-series data.

* * * * *